Aug. 5, 1941.  N. C. PRICE  2,251,420
BOILER FOR AIRCRAFT HEATING SYSTEMS
Original Filed Aug. 23, 1937
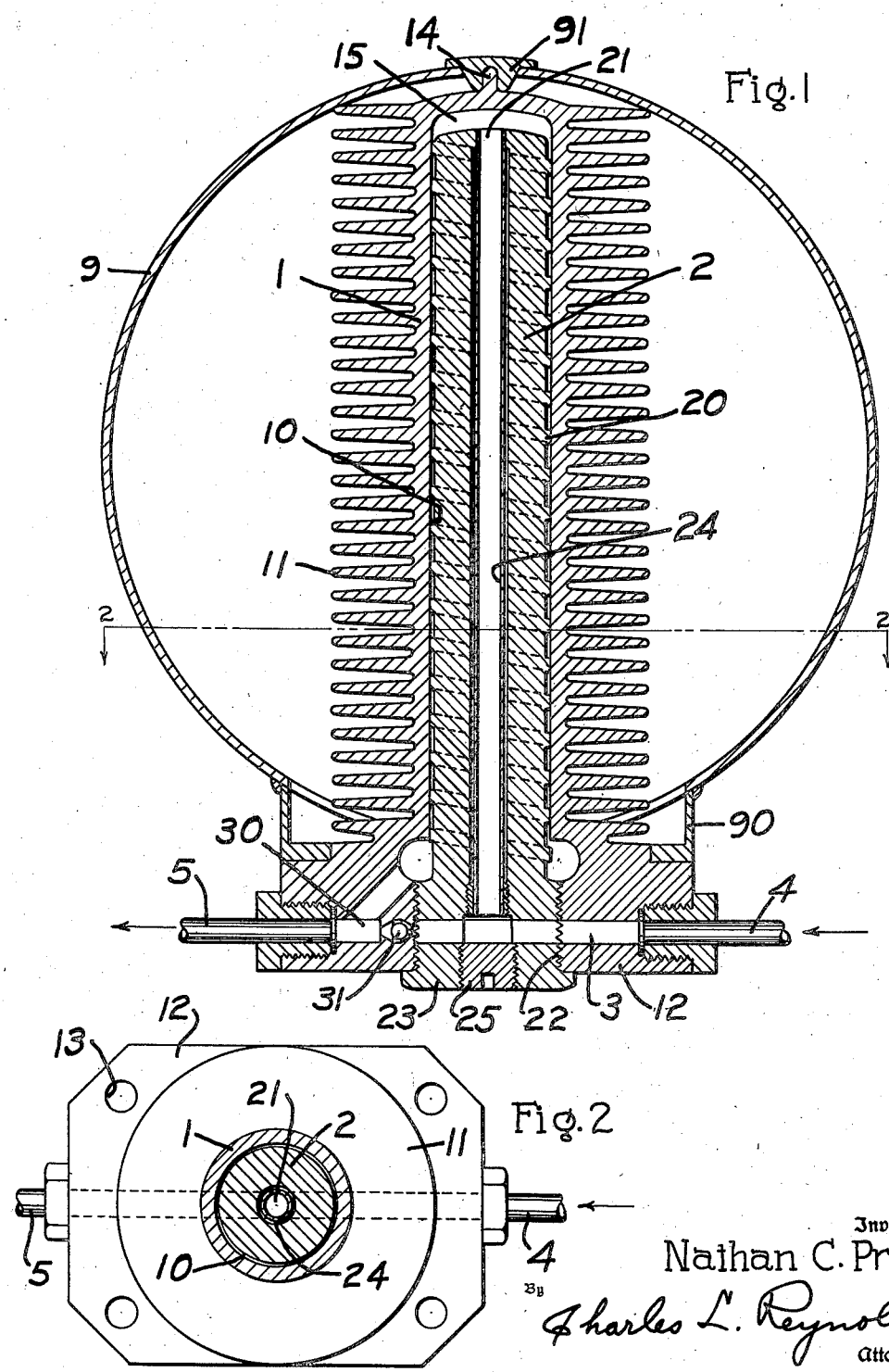
Inventor
Nathan C. Price
By Charles L. Reynolds
Attorney

Patented Aug. 5, 1941

2,251,420

UNITED STATES PATENT OFFICE 2,251,420

BOILER FOR AIRCRAFT HEATING SYSTEMS

Nathan C. Price, Seattle, Wash., assignor, by mesne assignments, to Boeing Aircraft Company, Seattle, Wash., a corporation of Washington Original application August 23, 1937, Serial No. 160,372. Divided and this application November 20, 1937, Serial No. 175,682

7 Claims. (Cl. 122—7)

The present invention has been designed as a boiler for extraction of heat from the exhaust gases of an airplane engine or the like for use upon a distant part of the airplane, as, for instance, in a cabin heating system or in a galley heating system, and in that specific use involves certain problems that have troubled designers of such auxiliary heat-converting devices. However, the invention is applicable to other uses, and is more generically a means for absorbing heat from hot gases and thereby heating a fluid, as water, to be converted into steam, and in such heated form to be used for heating spaces, bodies, or for operating auxiliary engines. Also the fluid employed may be other than water, and may be, for instance, ethylene glycol, chosen because of its stability when heated and its low freezing point, making it suitable for use where portions of the system may stand exposed to freezing temperature for considerable periods.

The present application is divided from my application Serial No. 160,372, filed August 23, 1937.

My present invention is analogous in many respects to a series tube boiler. However, for use upon airplanes, where space and weight are at a premium, it is essential that the boiler be made as compact and light in weight as is possible, yet that it be so formed and arranged as to absorb the maximum of heat from the exhaust gas with a minimum of impedance to the flow of such gas, which would tend to create an undesirable back pressure upon the engine.

In the specific use for which this boiler is designed, i. e., extracting heat from the exhaust gas of an aircraft engine, wherein the boiler is inserted within and transversely of the exhaust stack, it will be realized that very high temperatures (sufficient to heat the stack to incandescence) are imposed upon the boiler, and result in the creation of large stresses within the boiler. The unidirectional characteristic of the exhaust gas flow over and past the boiler tends to heat the side of the boiler which is first encountered by the exhaust gas (and the circumferentially disposed external fins of appreciable depth) to a considerably higher degree than the opposite side thereof. This creates large stresses, which if not relieved or prevented, may cause cracking of the boiler shell or of the fins. The admission of liquid water to the boiler's long, continuous helical passage at one end, where it is exposed suddenly to the intense heat of the boiler, and from which passage it emerges, in a few inches overall length of the boiler, as highly heated, high pressure dry steam, tends to create large stresses. The practical necessity, or at least the great convenience, of admitting the water at the same end of the boiler as the end from which the steam emerges, at a temperature hundreds of degrees higher, tends to create large stresses. The arrangement, structure, and control of the boiler, to avoid the creation of destructive stresses, under conditions so favorable to their creation, is a further object of this invention.

It is also necessary that the boiler be of a type which is readily cleaned, or which is in effect substantially self-cleaning, and that it be self-draining in installations contemplating the use of water. Simplicity of construction and freedom from service difficulties are also essentials to be secured in such a boiler.

With these and other objects in mind, as will appear hereafter, my invention comprises the novel boiler, and the novel association and arrangement of the parts thereof, with respect to each other and to the exhaust stack and other parts of the system, all as is shown in the accompanying drawing, described in this specification, and more particularly defined by the claims which terminate the same.

In the accompanying drawing I have shown my invention embodied in an illustrative form.

Figure 1 is an axial section through the boiler, showing the same installed in an exhaust stack.

Figure 2 is a transverse section through the boiler, taken substantially on the line 2—2 of Figure 1.

The shell of the boiler is formed as a cylindrical sleeve 1, having a hollow bore 10, which preferably is smooth-walled. Externally it is provided with a plurality of deep circumferential fins 11, and, since the boiler is disposed generally diametrically across the exhaust stack 9, these fins are arranged in planes which lie in the line of movement of hot exhaust gases through the exhaust stack. In this manner maximum heat pick-up with least impedance of the exhaust gases is obtained. The boiler is made of metal, nickel, for instance, of good heat-conductivity, and of suitable strength at the temperatures involved, and the fins are preferably formed integrally with the metal of the sleeve.

In installations where drainage must be accomplished the boiler is placed upright. The lower end or base of the sleeve 1, indicated at 12, may likewise be formed integral with the shell, and is formed for securement to a hollow boss 90 secured, as by welding, about an opening in the lower part of the stack 9. The securement of the base 12 to the boss 90 is by means of bolts received in the holes 13 (see Figure 2). By such a mounting the entire boiler may be removed as a unit from the stack, if need be. Its upper end is preferably provided with a tip 14, received in a socketed button 91 disposed within or formed as part of the stack 9, this serving to prevent vibration of the boiler relative to the stack 9.

Received within the bore of the sleeve is a core 2, and its outside diameter is slightly less than the inside diameter of the bore 10. Spacing apart the core and the sleeve is a helical rib 20 of rather low pitch, comparable to the spacing of the fins 11. This is preferably, but not necessarily, formed upon the exterior of the core 2. Its function is to define between its convolutions a long helical and preferably shallow path for the fluid, from end to end of the bore 10, so that fluid introduced into one end of this helical path, under pressure, is caused to pass along it at high speed, and thus to become highly heated by its centrifugally assured contact with the highly heated metal wall of the sleeve 1. Conversely, since the wall at the rear of the boiler is cooler than the front wall, the rapid circulation of fluid tends to equalize the temperatures, and to prevent excessive stresses—stresses such as have caused cracking of the fins 11. Fluid is supplied to a chamber 15 at the upper end of the boiler, and at the entrance to the helical path, through a through passage 21 in the core.

The core is threaded, as indicated at 22, within the base 12, and a passage 3 in the base 12 and in the head 23 of the core affords communication between a supply tube 4 and the interior of the through passage 21. A discharge passage 30 affords communication between the discharge end of the helical path and a discharge tube 5. The passages 3 and 30 likewise communicate with each other through a passage closed by a check valve 31. These passages 3 and 30 are located at the lowest point of the boiler, when drainage is a factor, in such a way that fluid may drain from the helical path defined by the rib 20 through the passages 30 and 3, and back through the supply tube 4 to the supply source. However, with the fluid supplied through the passage 3 under pressure, the valve 31 is seated, and direct communication is thereby cut off between the supply passage 3 and the discharge passage 30.

The fluid supplied through the through passage 21 is considerably cooler than the fluid discharged into the passage 30, yet is separated therefrom by only the thickness of the wall of the metal core 2. In order to insulate the two passages, and to prevent excessive stresses because of temperature differences, especially at the lower end, where the incoming fluid is the coolest and the outgoing fluid is the hottest, in some instances I propose to insert a tube 24 within the passage 21, spaced inside of the walls of the passage throughout most of the length of the latter. This provides a dead space which may, by expulsion of air, become a vacuum space, or which may become filled with steam or vapor, in either case serving as an insulating sleeve around the tubular insert 24. This tube 24 is secured within the end of a plug 25, insertable within the head 23 of the core.

In operation, water, ethylene glycol or other suitable fluid is supplied under appreciable pressure through the supply tube 4, passage 3 and passage 21, to the chamber 15, where it enters the helical path defined by the rib 20, and is moved along this passage at high speed, due to the pressure and the constriction of the area of the passage. Thus the liquid is thrown centrifugally outward into intimate contact with the inner wall of the bore 10. The sleeve 1, which becomes highly heated by the exhaust gases contacting it and contacting the fins 11, heats the liquid to a high degree, and if the liquid is convertible into vapor at the temperatures obtaining it is converted during its passage through the helical path. The liquid, so long as it remains liquid, hugs the heated wall of the sleeve 1, due to the centrifugal effect, thus effecting separation of vapor and liquid as both flow through the helical channel at high speed. Thus heated or converted, the fluid passes out through the passage 30 and tube 5, whence it may be conveyed to a point of use.

Should it be desired to inspect or to clean the interior of the boiler, it is only necessary to unscrew the head 23 of the core and to withdraw the latter longitudinally from within the bore 10. Because the helical rib 20 fits closely within the smooth bore 10 the latter is scraped clean of any deposit tending to form upon its walls by the mere acts of unscrewing and of withdrawing the core. The exterior of the core, when withdrawn, is readily available for cleaning, and the tubular insert 24, if used, may be withdrawn by unscrewing the plug 25, and may be cleaned or a new insert may be put in its place. It is immaterial that the insert may not fit closely at the top of the core, since it is expected that the space between the tube 24 and the bore of the core will be filled with vapor of the fluid which is being heated. The entire boiler as a unit may be withdrawn from the stack upon removal of the bolts from the holes 13 and disconnection of the tubes 4 and 5. However, because of the extreme simplicity of construction of the boiler it will seldom be found necessary to disassemble or to remove it. The arrangement permits substantially unimpeded drainage and thus protects the boiler and the associated parts of the system from liability of injury due to freezing, when the fluid employed is subject to freezing.

The drawing shows a typical boiler substantially in full size, and yet capable of absorbing a large quantity of heat, though the boiler is very low in weight. This heat may be employed, as in the parent application referred to above, to heat the interior space of an airplane cabin, or it may be employed to heat a galley, to accomplish the cooking of food while in flight. On the other hand, the boiler may be employed to generate steam for operation of auxiliary power plants upon aircraft. Being small and with the fins arranged to produce the least impedance upon the exhaust gases flowing through the stack 9, it impedes but little the passage of these hot gases, and therefore produces the minimum of back pressure upon the engine.

What I claim as my invention is:

1. A boiler to extract heat from the exhaust gas of an airplane engine or the like, comprising an externally finned, smooth bored sleeve for disposition in the exhaust stack of such engine, a hollow core removably secured within the sleeve's bore, helically disposed external ribs on said core lying closely adjacent such bore to define a helical path for a fluid, delivered thereto from the bore of said core, passages in the sleeve communicating with the opposite end of the core's bore, and with the discharge end of the helical path, for delivery and drainage of fluid, and valve means in the passages to prevent by-passing of the fluid through such passages, when the fluid is moving under pressure, in a given direction through the boiler.

2. A boiler for extraction of heat from the exhaust gas of an airplane engine or the like, comprising an externally finned smooth bored sleeve for insertion within such exhaust stack, to be heated by the exhaust gases passing therethrough, a core having a through passage, and external helical ribs closely fitting within said sleeve, to define a helical path for a fluid received through said through passage, the boiler having a discharge port from such path, and a fluid supply port connected to the through passage, both located at the lowest point of the boiler, and a by-pass port connecting the discharge port and the supply port, for drainage from the former to the latter, and a check valve in said by-pass port arranged to prevent passage of fluid direct from the supply port to the discharge port, while still permitting such drainage.

3. A boiler for generation of steam from water, by utilization of the heat of the exhaust gas of an aircraft engine or the like, and for disposition transversely of the path of exhaust gas flow, said boiler comprising a cylindrical sleeve having an axial bore, a plurality of thin circumferential fins, each of an overall diameter not less than about twice the external diameter of the sleeve, disposed in heat exchange relation to the sleeve, and having their surfaces spaced apart by a distance approximating the thickness of a single fin, such fins being disposed in the path of and parallel to the direction of exhaust gas flow, a cylindrical, coaxially disposed core within the bore of the sleeve, of an external diameter slightly less than that of the sleeve's bore, a thin helix, of a pitch not substantially in excess of the spacing, along the sleeve, of alternate fins, interposed between the adjoining walls of the bore and core, to define, with the latter, a substantially continuous long, shallow, helical path, through which the water, and the steam as it is generated, will pass at high velocity in a thin stream, and means to admit the water to one end of said helical path, and to draw off the steam at its opposite end, whereby, by the water-steam circulation at high velocity, to equalize the temperature of each fin circumferentially about the boiler and thus to minimize stresses in the fins.

4. A boiler for generation of steam from water, by utilization of the heat of exhaust gas unidirectionally flowing through the exhaust stack of an aircraft engine or the like, which boiler comprises a cylindrical sleeve having an axial bore, and disposed transversely within the exhaust stack, a plurality of wafer-like fins disposed about and along said sleeve, in heat exchange relation thereto, and disposed generally parallel to the direction of the exhaust gas flow, said fins having an overall diameter of substantially twice the external diameter of the sleeve, and being spaced apart lengthwise of the sleeve by a distance not substantially in excess of the thickness of a single fin, a cylindrical, coaxially disposed core within the sleeve's bore, and spaced slightly from the wall of the bore at all points, a thin helix, of a pitch not substantially in excess of the distance between every other fin, measured lengthwise of the sleeve, interposed between the wall of the bore and the external surface of the core, to maintain said sleeve and core in definitely spaced relationship and to define a substantially continuous, long, shallow, helical path, means to guide water at high velocity and under pressure into such path at one end, to pass therealong in one direction only, and to issue at its other end as steam, by such high velocity and low pitch to equalize the temperature of each fin circumferentially about the boiler and thus to minimize stresses in the fins arising from the unidirectional characteristic of the exhaust gas, and to produce a gradual temperature gradient lengthwise of the sleeve.

5. The combination of claim 4, wherein the pitch of the helix is approximately equal to the spacing of the fins, to effect circulation of steam at approximately constant temperature substantially around the base of each fin.

6. A boiler for generation of steam from water by heat of exhaust gas from an internal combustion engine, comprising a cylindrical exhaust gas pipe having an aperture in one side thereof, a sleeve having a closed end projecting into said exhaust gas pipe through such aperture and extending diametrically across said pipe into abutment with its opposite side, means interengaged between said closed sleeve end and such opposite side of said exhaust gas pipe to anchor such sleeve end, a flange about the exhaust gas pipe aperture supporting said sleeve and sealing the joint between the sleeve and aperture, said sleeve having parallel annular fins projecting outward therefrom in radial planes disposed parallel to the flow of exhaust gas through said pipe for through passage of exhaust gas between said fins, a hollow core of slightly smaller external diameter than the bore of said sleeve inserted coaxially within it, into position slightly spaced from its closed end, to leave a space in communication with the core's hollow, a helical rib of low pitch encircling said core and maintaining it spaced definitely from said sleeve, to define a long, shallow, helical path for fluid to be heated, removable means interengaged between the end of said core and the end of said sleeve outside said exhaust gas pipe for retaining the core within said sleeve, a water feed conduit communicating with the end of said core's hollow outside said exhaust gas pipe, and a steam delivery conduit communicating with the end of such helical path remote from the closed end of said sleeve.

7. A boiler for generation of steam from water by the heat of exhaust gas from an internal combustion engine, comprising an exhaust gas pipe having an aperture in one side thereof, a sleeve having a closed end projecting into said exhaust gas pipe through such aperture and extending diametrically across said pipe substantially into abutment with its opposite side, means interengaged between said closed sleeve and said exhaust gas pipe to anchor the sleeve in such diametrically disposed, substantially end abutting relationship to the pipe, means sealing the joint between the sleeve and aperture, said sleeve having parallel annular fins projecting outward therefrom in radial planes disposed parallel to the flow of exhaust gas through said pipe for through passage of exhaust gas between said fins, a hollow core of slightly smaller external diameter than the bore of said sleeve inserted coaxially within it, a helical rib encircling said core and maintaining it spaced definitely from said sleeve, to define a shallow helical path for fluid to be heated, communicating with the core's hollow, a water feed conduit and a steam delivery conduit communicating one with the end of said core's hollow outside said exhaust gas pipe and the other with the end of such helical path remote from the closed end of said sleeve.

NATHAN C. PRICE.